United States Patent [19]

Jaisle et al.

[11] 3,997,696

[45] Dec. 14, 1976

[54] TEXTURED LAMINATE AND METHOD OF MANUFACTURE

[75] Inventors: Richard Frederick Jaisle, Harrison; George Edward Power, Cincinnati, both of Ohio

[73] Assignee: Formica Corporation, Cincinnati, Ohio

[22] Filed: Dec. 10, 1974

[21] Appl. No.: 531,275

[52] U.S. Cl. .............................. 428/164; 156/219; 156/220; 156/323; 156/581; 428/172; 428/302; 428/444; 428/445; 428/908

[51] Int. Cl.² ...................... B32B 3/28; B32B 5/04; B31F 1/00

[58] Field of Search ........ 428/172, 239, 251, 271, 428/443, 444, 445, 908, 156, 161, 164, 302; 156/209, 219, 220, 289, 323, 581

[56] References Cited

UNITED STATES PATENTS

| | | | |
|---|---|---|---|
| 1,548,910 | 8/1925 | Sherman | 428/445 |
| 2,278,291 | 3/1942 | Swan et al. | 427/198 |
| 2,606,855 | 8/1952 | Jenkins | 156/219 |
| 3,018,206 | 1/1962 | Hood et al. | 428/443 |
| 3,303,081 | 2/1967 | Michaelson et al. | 156/289 |
| 3,311,520 | 3/1967 | Michaelson et al. | 156/289 |
| 3,373,068 | 3/1968 | Grosheim et al. | 156/219 |
| 3,616,011 | 10/1971 | Endrizzi | 156/219 |
| 3,718,496 | 2/1973 | Willard | 428/172 |
| 3,793,125 | 2/1974 | Kunz | 156/220 |
| 3,802,947 | 4/1974 | McQuade, Jr. | 156/220 |

FOREIGN PATENTS OR APPLICATIONS

| | | | |
|---|---|---|---|
| 22,496 | 1/1901 | United Kingdom | 428/445 |

*Primary Examiner*—George F. Lesmes
*Assistant Examiner*—Charles E. Lipsey
*Attorney, Agent, or Firm*—Frank M. Van Riet

[57] ABSTRACT

A process of making heat and dimensionally stable, consolidated, laminated, asbestos cored, textured unitary structures for use in making textured decorative laminates, and said structures per se, are disclosed.

10 Claims, No Drawings

TEXTURED LAMINATE AND METHOD OF MANUFACTURE

BACKGROUND OF THE INVENTION

For many years decorative laminates have been used as a surfacing material in residential and commercial structures wherein aesthetic effects are desired in combination with functional behavior such as wear, heat and stain resistance. Typical applications of said laminates are surfacing for walls, partitions, table tops, counter tops, furniture, doors and the like. Such decorative laminates generally are produced from a plurality of resin impregnated core sheets usually composed of kraft paper which has been impregnated with a thermosetting resin and, more particularly, with a thermosetting water-soluble or water-insoluble phenolic resin. When the kraft paper has been impregnated with the thermosetting resin, the sheets are dried and cut to the appropriate size. Thereupon, a plurality of these resin impregnated sheets are stacked in a superimposed relationship. The number of plies or sheets in the stack depends on the ultimate intended use of the laminate. For most purposes, the number of plies of these core sheets will total about six to nine but can total as many as 12–15.

There is placed on the stack of core sheets a decorative sheet which is generally a sheet of alpha-cellulose paper bearing a printed design or a light color and impregnated with a noble thermosetting resin which is not subject to significant darkening upon the application of heat. Suitable resins for the decorative sheets are the aminotriazine resins and more particularly the melamine-formaldehyde resins, the benzoguanamine-formaldehyde resins and the unsaturated polyester resins and the like. It is generally desirable when making decorative laminates to make use of a protective overlay sheet which is placed atop and is similar to the decorative sheet but is generally devoid of design and in the final laminate is transparent. The stack of impregnated sheets is inserted into a laminating press and is heat and pressure consolidated to a unitary structure. During the consolidation step, the thermosetting resins are converted to the thermoset state thereby providing an extremely hard, attractive and permanent surfacing material. For obvious economic reasons, it is common practice to consolidate a plurality of these individual laminating assemblies into one large assembly, or press pack, said stacks being separated from one another by a release sheet, and then to laminate this pack by heat and pressure application.

In building such a pack, an individual assembly is placed with its decorative overlayment surface adjacent to a highly polished stainless steel press plate. The function of the press plate is twofold. First, it provides a smooth, defect-free surface to one side of the laminate. Second, it serves to separate pairs of back-to-back assemblies, thus permitting a plurality of these assemblies to be consolidated into laminates in one operation, usually in back-to-back relationship.

The press pack is then pressed or molded. This is accomplished by placing the pack between the platens of a hydraulic press. The press usually has multiple openings so that up to 22 or more packs may be pressed at once. Such an approach produces a very smooth surface laminate with a glossy finish. Other techniques are used to produce laminates with a smooth surface finish but with a satin or brushed textured effect.

More recently, the dictates of fashion have demanded textured laminates which have a three dimensional surface configuration. Earlier investigators have used either embossed, machined or etched three dimensional metal press plates in making such decorative laminates, directly from these plates. While successful, such procedures have proven exceedingly expensive because of the high cost of preparation and maintenance of each plate. Other investigators proposed making the plates out of other materials having the desired configuration but these were not entirely satisfactory because of the failure, in one way or another, of these materials during the high temperatures and pressures used in laminating.

U.S. Pat. No. 3,303,081 to Michaelson et al. solves some, but by no means all, of the problems related to making dimensional decorative laminates by teaching a method of making a negative surface laminate "master" which is to be then used to prepare decorative laminates of conventional construction. In all the disclosed examples, a phenolic resin impregnated kraft paper core is used in production of the master. A later U.S. patent to Michaelson states that the masters made according to U.S. Pat. No. 3,303,081 have a limited life of forty pressings, after which they delaminate and become ineffective for further molding. This later U.S. Pat. No. 3,311,520, solves the delamination problem of the former by incorporating into the master a dimensionally stable metal core. While the metal core masters are more useful in that they can be used many more times without delamination to produce decorative laminates or additional masters, they are themselves quite heavy and expensive and tend to present problems with regard to the adhesion of the metal to the Kraft paper which is present on its planar surfaces and constitutes the remainder of the core of the master.

SUMMARY OF THE INVENTION

We have now found that dimensionally stable laminated masters can be produced, which masters have been found to be excellent for making decorative laminates directly therefrom, by incorporating asbestos sheets in the core thereof. These masters can be easily prepared from sculptured furnace cement plates, engraved plates, etched plates and the like, as shown in both Michaelson patents, above.

Since the plates from which the instant masters are prepared are very expensive and tend to wear out rapidly if they are used to directly produce decorative laminates, as mentioned above, our invention entails less use of these plates and consequently lengthens the life thereof. If the masters are then used to produce reproduction masters and copy masters, i.e. other laminate masters from which ultimate decorative laminates are produced, each use of the expensive metal plate results in thousands of decorative laminates.

DESCRIPTION OF THE INVENTION INCLUDING PREFERRED EMBODIMENTS

As mentioned briefly above, our invention resides in a new group of laminate masters useful in the production of decorative laminates. The masters each can be used to prepare hundreds of decorative laminates without undergoing the serious dimensional variations which occur using conventional masters such as shown by Michaelson et al., above. Since our masters can now be used to prepare many more decorative laminates than those of the prior art due to their greater longevity, substantial savings are realized by the prevention of extreme wear and tear on the more expensive metal plates containing the original design.

The above-mentioned longevity, i.e. dimensional stability, is imparted to our masters by the incorporation therein of a resin-impregnated asbestos core. That is to say, we have found that if the core is made up of at least about 45%, by weight, based on the resin-free weight of the core, of asbestos and has not more than 55%, by weight, of a telegraphing preventive layer on at least the surface thereof adjacent to the design imparting side of the master, a durable, heat-stable, non-shrinking, textured surfaced master may be produced.

While the use of asbestos per se as the core of a laminate has been suggested, see both Michaelson et al. patents set forth hereinabove, it has not been previously recognized that such a core must have a telegraphing preventative layer thereon or that the asbestos fibers must be of a specific minimum size. Additionally, it was not previously recognized that asbestos would impart the unexpected properties to the masters which they have exhibited. More particular reference to the uniqueness of the instant masters may be obtained from the examples below.

Asbestos is available in the man-made form of mats, fabrics, long- and medium-length felts, yarns and textiles, and bulk fiber. The significant physical properties which generally serve to identify and characterize asbestos are incombustibility and fibrous structure. The latter property permits it to be separated into filaments or fibers, many of which possess high tensile strength and good flexibility. In addition, a unique chemical feature which is characteristic of asbestiform minerals is that each exhibits some degree of hydration or contains specific amounts of chemically combined water within the lattice structure. This particular property may contribute to some of the unusual performances of the instant laminates.

There are approximately 30 known fibrous minerals that are considered to be asbestiform in character and each possesses inherently unique and significant properties related to composition, strength and flexibility which ultimately determine its usefulness. Only three of these fibrous minerals are considered to be commercially important, namely chrysotile, crocidolite and amosite. Chrysotile is a fibrous variety of serpentine; crocidolite and amosite are amphiboles.

Chrysotile is a hydrous magnesium silicate having the basic structural formula $Mg_3Si_2O_5(OH)_4$. As this mineral occurs in deposits located throughout the world, it exhibits some variety in chemical constitution. Magnesium may be partially replaced by iron and traces of calcium and aluminum may be found to be present in the structure. Also, magnetite ($Fe_3O_4$) as an extraneous impurity, may occur in amounts of from only a trace up to 6%. We have found that chrysotile is the preferred asbestos form found suitable for use in the present invention, while the others may be used, if necessary or desired.

We believe that the physical properties of chrysotile asbestos which are particularly significant and contribute to its excellence as a reinforcing medium when combined with organic resins to produce our novel laminates, are strength, toughness and flexibility at both room and elevated temperatures.

The elevated temperature properties of chrysotile asbestos are significant and in the crude form, when subjected to temperatures up to 1200° F., it has shown strength and structure retention much higher than is exhibited by many other fibrous minerals.

The presence of water in the chemical constitution of asbestos is also believed to contribute markedly to the unique elevated temperature characteristics of our novel masters. The hydrous constituent which is present in the asbestos structures, as (OH), requires considerable quantities of thermal energy to effect its release and elimination from the unit structure. Because of this endothermic reaction and its attendant heat-sink characteristics we believe that the elevated temperature strength and structure of the asbestos core preserves the masters for extended periods of time.

We have also found that the fiber size of the asbestos material which is used to prepare the core sections useful in our novel laminates is critical. That is to say, asbestos fibers are classified ranging from those indicated as No. 1 fibers to those indicated as No. 7 fibers, the lower numbered fibers being larger. We have found that using No. 7 fibers, only one telegraphing preventive layer is needed on the asbestos core surface but as the fiber classification goes down, more of said preventive layers must be used because the fibers are larger. We cannot use fibers of a size under those classified as No. 3. Therefore, the asbestos core must be produced from fibers ranging from size No. 3 to size No. 7 as defined by Kirk-Othmer Encyclopedia of Chem. Tech. 2nd Ed. Vol. 2 pp. 734–746.

As mentioned above, we have found that at least about 45%, by weight, of the core, i.e. the asbestos and the telegraphing preventive layer or layers, must be composed of asbestos, with at least about 65%, by weight, being preferred, said weights being determined on a resin-free basis. Of the asbestos material in the core, at least about 85%, by weight, of it must be composed of the fiberous asbestos mentioned above, the remaining 15%, by weight, being binders such as starch, etc. or fillers such as kraft fiber, etc.

One particular asbestos material we have found to be particularly preferred is a chrysotile asbestos paper sheet (6 lbs. per 100 sq. ft.) obtained from Nicolet Industries consisting of about 85–90% No. 7D grade asbestos fibers, about 1–5% kraft fiber and about 8–9% starch, as a binder. Although asbestos paper has been found preferable in the manufacture of our laminates, we may also use tightly woven asbestos materials such as cloth or pressed materials such as mats, etc. which are made of the same material and conform to the other critical limitations mentioned above.

Impregnation of the asbestos material with a water-soluble phenol/formaldehyde resinous solution to about a 30% resin content and drying to a volatile content of about 2% has proven very successful. Generally, a range of impregnation of from about 15% to about 50% and drying to a volatile content of not more than 10% has been shown to be satisfactory.

With regard to the telegraphing preventive layer, we have also found that any cellulose based paper may be used for this purpose with alpha-cellulose, kraft paper and the like being exemplary. A preferred paper useful for this purpose is phenolic resin impregnated Clupak kraft paper. This material is well known and is sold by the West Virginia Pulp and Paper Company. The telegraphing preventative layer should be applied to the side of the asbestos resin impregnated assembly which is to be used to impart the textured design to the ultimate decorative laminate so that the coarse texture of the asbestos, which would otherwise telegraph to subsequent masters or to the decorative laminate, is hidden. This layer, or layers, imparts smoothness to the textured surface of the master thereby allowing it to mirror only the texture imparted by the design plate and nothing else. It blocks out the undesirable configuration of the fibers of the asbestos which would otherwise show through to the surface and be transmitted from master to master and then to the final decorative laminate.

Saturating Clupak paper is a commercially available extensible kraft paper which can be stretched in both directions, however, it can be stretched only 8% in one direction and only about 2-4% in the other. This extensibility allows the paper to be stretched over the original metal plate containing the textured design and subsequent plates during the pressing operation and thus allows more definition of design detail in the laminated masters. The Clupak paper must be impregnated with a water-soluble phenol-formaldehyde resinous solution, preferably up to about a 50% resin content, preferably from about 15-50%, and dried to a flow of up to about 20%, preferably about 5-20%, to be used satisfactorily.

According to the process of the instant invention, a durable, heat-stable, non-shrinking, textured master for use in producing textured decorative laminates is produced by heat and pressure impressing a positive or negative design containing plate into an assemblage of (1) a plurality of thermosetting resin impregnated asbestos sheets, said assemblage having a resin-free basis weight of at least about 45% of asbestos containing at least about 85% of No. 3 to No. 7 asbestos fibers and (2) at least one sheet of a telegraphing preventive material adjacent said design plate, to thereby form a master having a reverse image of said design plate thereon. Usual heat and pressure consolidating conditions are employed.

This master is then used to produce more masters or to produce a final decorative laminate. If a new master is to be produced, the master is used in the same manner as the design plate detailed above. If a decorative laminate is to be produced, a superimposed relationship of
1. a plurality of thermosetting phenolic resin impregnated cellulosic core sheets,
2. a decorative sheet positioned immediately above said (1) and impregnated with a noble thermosetting resin
3. an optional protective overlay sheet
4. a release sheet, and
5. the asbestos cored master prepared above with its textured surface adjacent said (3)
is formed and is heat and pressure consolidated into a decorative laminate having on its surface the exact image of the original design plate, the laminate being recovered by separating it from the master at the locus of the release sheet.

The decorative sheet used in manufacturing the laminate is well known in the art and generally comprises an alpha-cellulose print sheet having a basis weight of about 50-123 pounds per ream. The resin with which it is impregnated is generally a melamine-formaldehyde resin. From about 35 to about 55%, by weight, based on the total weight of the sheet, of the resin is impregnated into the sheet.

An overlay sheet may be placed between the decorative sheet and the release sheet, if desired, to provide a protective surface to the decorative laminate as is known in the art. In such an instance, an alpha-cellulose paper may be used having a basis weight of about 10-35 pounds per ream and impregnated with a melamine-formaldehyde resin to a content between about 50 and 75%, by weight, based on the total weight of the sheet.

The master may be further modified by placing a sheet of adhesive backed metal foil, such as aluminum foil, over the telegraphing preventive layer to thereby form a metal clad master which may be used as above. Each so formed master, above, may then be used to manufacture other asbestos cored reproduction masters or copy masters, etc., with or without foil coatings, or may be used to produce the ultimate decorative laminates, as described heretofore. The metal foils may be adhered to the cores of the masters by the use of any known adhesive found useful for this purpose. Phenol-butyrate adhesives, nitrile rubber modified phenolic adhesives and the like have been found effective.

In carrying out the various steps of the present invention, it is frequently desirable to make use of a release sheet or release paper that is positioned between the original design plate and the layers of resin impregnated paper that are to be converted to a design carrying laminate, as indicated above. These release members are used for both the surface and the back of the decorative laminates and masters. Among those which may be used in practice of the present invention are aluminum foils, paper backed aluminum foils, glassine, polypropylene films and the like.

The following is a detailed description of our process of producing a 4 × 10 feet textured, high pressure laminate. It will be obvious to anyone skilled in the art that the description using a 4 × 10 feet size textured laminate does not restrict the scope of the process to any particular sized laminate.

The original design plate can be prepared from a flat iron sheet that is approximately 0.135 inch in thickness and of a suitable length and width in keeping with the size of the ultimate laminate to be produced. The iron plate is mechanically or chemically etched on one side. This surface design may be used in and of itself. More preferably, a ceramic like material capable of withstanding high temperature and pressure (such as a commercially available asbestos furnace cement) is applied to the etched surface and a textured design can be made in the furnace cement by hand, using a sculpturing tool such as a spatula. The textured furnace cement coated plate is then dried in a forced air oven for about 16 hours at 80° C. The drying removes the volatiles and hardens the cement thereby improving its bond to the base plate. Other high temperature ceramic materials could be used such as porcelains, liquid silicates filled with refractory fibers and the like. After drying, the textured surface is coated with a silicone release agent which is then allowed to air dry. This final baked plate, called the design plate, is ready for use. It is a positive image of the ultimate textured design. The process for making such a textured design model is more fully disclosed in U.S. Pat. No. 3,718,496, issued Feb. 27, 1973, which patent is hereby incorporated herein by reference. There are other methods for preparing the design plate, such as cast aluminum or steel plates by way of plaster of paris or sand mold techniques. Still further, acid etched or electrodeposited plates or other textured laminates may be used as the design plate.

The following examples are set forth by way of illustration only and are not to be construed as limitations on the present invention except as set forth in the appended claims. All parts and percentages are by weight unless otherwise specified.

EXAMPLE 1

A. A 51 × 125 inch design plate having a bathroom tile-like design thereon is prepared by etching the grout lines of the tile configuration into one side of a steel plate by using an aqueous solution of ammonium persulfate and allowing the etchant to penetrate the steel to a depth of 20 to 25 mils.

B. An assembly for producing a "design master" is prepared of the following items reading from top to bottom:
1. a topmost iron plate,
2. 8 sheets of kraft paper cushion,
3. a sheet of 2–4 mil thick, dead soft aluminum foil, having an abraded side facing (4),
4. a sheet of Clupak kraft paper impregnated with a water-soluble phenolic resin, and coated on the side facing (3) with a phenol-butyrate adhesive,
5. 12 sheets of No. 7D asbestos fibers processed into paper weighing 6 lbs/100 ft² impregnated with a water-soluble phenolic resin
6. same as (4)
7. same as (3)
8. the design plate A, above, with the tile-like design facing (7)
9. a layer of release paper
10. 8 sheets of kraft paper cushion, and
11. the press pan.

The assembly set forth hereinabove is introduced into a laminating press and consolidated under heat and pressure into a textured laminated unitary structure. The pressure is applied until a net pressure in excess of 1,000 psi exists over the projected area of the sheets being laminated. With the assembly under suitable pressure, the temperature is raised in about 19 minutes to 130° C., held for 5 minutes, then the temperature is raised to 140° to 145° and held for 20 minutes at which time the assembly is cooled. After the pressing, the pack is removed from the press, the top iron and cushion are removed and the aluminum clad design master is separated from design plate (A). The aluminum foil is tenaciously bonded to the resultant asbestos core design master and carries on one broad face thereof a mirror image of the tile-like design from the etched design plate. The resulting design master is trimmed and readied for making two "reproduction masters".

C. Two aluminum clad design masters are used to make single sided reproduction masters by heat and pressure consolidating an assembly produced as follows:
1. a topmost iron plate,
2. 16 sheets of kraft paper cushion,
3. the aluminum clad design master, design facing (4),
4. a sheet of Clupak kraft paper impregnated with a water-soluble phenolic resin,
5. 12 sheets of the asbestos paper described above impregnated with a water-soluble phenolic resin,
6. same as (4),
7. a sheet of a glassine separator,
8. same as (2),
9. same as (7),
10. same as (4),
11. same as (5),
12. same as (4),
13. same as (3), design facing (12),
14. same as (2),
15. press pan.

Known modification of the above assembly would, of course, enable the production of double sided reproduction masters. The assembly set forth above is introduced into a laminating press and consolidated under heat and pressure so as to convert (by curing the thermosetting resin into the thermoset state) the assembly into a reproduction master by using the same procedure as used above for making the aluminum clad design masters. After the pressing, the pack is removed from the press; the top iron and cushion are removed and the reproduction masters are separated from the aluminum clad design masters. The reproduction masters have the exact tile-like design configuration as the design plate "A".

The resulting laminate is trimmed and readied for making two double sided "copy masters".

D. The following assembly is used.
1. a topmost iron plate,
2. 16 sheets kraft paper cushion,
3. a single sided, "reproduction master", design facing (4),
4. a double-faced sheet of aluminum foil release separator,
5. a sheet of Clupak kraft paper treated with a water-soluble phenolic resin,
6. 9 sheets of No. 7D asbestos paper as described above, treated with a water-soluble phenolic resin,
7. same as (5),
8. same as (4),
9. a double sided reproduction master,
10. same as (4),
11. same as (5),
12. same as (6),
13. same as (5),
14. same as (4),
15. same as (3), design facing (14),
16. same as (2),
17. press pan.

The assembly, as set forth above, is introduced into a laminating press and consolidated under heat and pressure so as to convert (by curing the thermosetting resin into the thermoset state) the assembly into copy masters by using the same procedure as used for making the aluminum clad design masters, above. After the pressing, the pack is removed from the press, the top iron and cushion are removed and the reproduction masters are separated from the copy masters. The aluminum foil release is stripped from the masters and discarded. The resultant copy masters have the exact tile-like design configuration as the design master. The resulting copy masters are trimmed and readied for use for making decorative laminates.

E. Decorative laminates are produced from the copy master as follows: five copy masters being used in a single press opening to produce ten decorative laminates per opening.
1. a topmost iron plate,
2. 8 sheets of kraft paper cushion,
3. 1 sheet of a glassine separator,
4. 7 sheets of kraft paper impregnated with a thermosetting phenolic resin,
5. 1 sheet of a decorative print, impregnated with a thermosetting melamine/formaldehyde resin,
6. 1 sheet of a thermosetting melamine resin impregnated overlay,
7. 1 sheet of an aluminum foil release, and 8. 1 design copy master,
9. the above assembly being repeated with four more copy masters and nine decorative laminate assemblies.

The entire assembly is inserted in a laminating press and heat and pressure consolidated as were the design masters. Upon removing from the press, the copy masters are separated from the resultant textured decorative laminates having a tile-like design configuration. The decorative laminates thus produced are then subjected to standard post-finish treatments such as trimming and sanding of the backs. The laminates are excellent in design.

EXAMPLE 2

The process of Example 1, Step E, was repeated 30 times on laboratory size plates to determine the dimensional stability of the copy masters outlined in Step D, Example 1. Two copy masters were made in nominal 16 × 18 size lab plates. Master No. 1 was made up of 16 laminations of a 100 lb. basis weight Clupak paper which was treated to a 50% resin level with a water-soluble phenolic resin. No. 2 master was made out of a combination of No. 7D asbestos paper, as described above, treated to 30–40% resin level with the same soluble resin. The Clupak used in this combination is the same as the one used to make Master No. 1. Sheet buildups are as follows:

| Master No. 1 | Master No. 2 |
|---|---|
| 16 laminations Clupak | 1 lamination Clupak |
| | 9 laminations asbestos |
| | 1 lamination Clupak |

The lab plates were measured and then each were used to press 30 decorative laminates. Measurements are as follows:

TABLE I

Shrinkage Data Comparing all Clupak Master and Asbestos/Clupak Master

| Paper and Resin | | ΘMeas. | Final Meas. | Inch Loss | % Loss |
|---|---|---|---|---|---|
| Master No. 1 | W. | 16-1/32" | 15-26/32" | 7/32 | 1.367 |
| | L. | 17-2/32" | 16-28/32" | 6/32 | 1.102 |
| Master No. 2 | W. | 17-16/32" | 17-15/32" | 1/32 | .179 |
| | L. | 19-24/32" | 19-23/32" | 1/32 | .158 |

As can be seen, the asbestos/Clupak combination is about ten times better than the pure Clupak master.

EXAMPLE 3

The process of Example 1, Step E, was again repeated thirty times on laboratory plates using faster curing water-soluble phenolic resin to saturate the Clupak paper. Also, perforated, 24 gage steel was buried in the middle of an all Clupak build-up to simulate U.S. Pat. No. 3,311,520. Sheet build-ups are as follows:

| Master No. 3 | Master No. 4 | Master No. 5 |
|---|---|---|
| 16 lams. Clupak treated to a 40–50% resin level with a fast setting, commercially available foundry resin. | 16 lams. Clupak treated to a 40–50% resin level and a water-soluble phenolic resin catalyzed with 5% NaOH. | 16 lams Clupak treated to a 40–50% phenolic resin level into the center of which was placed 24 gage, perforated steel (1/16 RD; 7/16 center-staggered holes) |

The lab plates were first measured, used thirty times to produce 30 decorative laminates, and then compared to results obtained in Table I.

TABLE 2

Shrinkage Date of Masters No. 3 – No. 5

| Master No. | | Θ Meas. | Final Meas. | Inch Loss | % Loss |
|---|---|---|---|---|---|
| 3. | W. | 16-2/32" | 15-30/32" | 4/32 | .781 |
| | L. | 17-2/32" | 16-29/32" | 4/32 | .735 |
| 4. | W. | 17-26/32" | 17-24/32" | 2/32 | .350 |
| | L. | — | — | — | — |
| 5. | W. | 16-1/32" | 16" | 1/32 | .195 |
| | L. | 17-2/32" | 17-1/32" | 1/32 | "* |

*Phenolic part of master shrank away from the cage of the steel screen.

In comparing the two tables, especially Master No.'s 2 and 5, it can be seen that the asbestos/Clupak type master is as good as, if not better than, a 24 gage piece of perforated steel for retarding shrinkage. It is noted, however, that the steel screen master shrank away and as such was not useful for producing further laminates. The asbestos core master, however, appeared to be exactly as produced and could have been used to produce many more laminates.

EXAMPLE 4 (Comparative)

When a decorative laminate was made with a copy master containing no telegraphing preventive layer, it had an undesirable burlap appearance since the asbestos fibers telegraphed their character into the decorative laminate surface. Hence, it is clear that the Clupak on the core surface masks the unwanted burlap-like fiber reproduction of the asbestos in the ultimate decorative laminate.

EXAMPLE 5

The build-up of Master No. 2 of Table 1 was again prepared and a series of masters similar thereto was also prepared by varying the number of laminations of asbestos (180 lbs./3000 ft.$^2$), and the laminations of Clupak (100 lbs./ 3000 ft.$^2$) on either side thereof. These masters were then used to each press thirty decorative laminates each. The results of these experiments with regard to size loss are set forth in Table 3, below.

each side thereof. After being used to press 45 reproduction masters, the resultant design master had lost only 1/32 off its length and width measurements. The % asbestos in the core was 53%, 93% of which was asbestos fibers.

EXAMPLE 17

Following the procedure of Example 16, a design master was produced utilizing crocidolite asbestos in place of the chrysotile thereof. Similar results were observed.

TABLE 3

| Ex. | Lams. of Kraft and Asbestos Kraft | Lams. of Kraft and Asbestos Asbestos | Kraft | Initial Measurement* L | Initial Measurement* W | Final Measurement* L | Final Measurement* W | Percent Loss* L | Percent Loss* W | Dry Basis Weight Per Ream$^1$ Kraft | Dry Basis Weight Per Ream$^1$ Asbestos | Total Weight$^1$ | % Asbestos |
|---|---|---|---|---|---|---|---|---|---|---|---|---|---|
| 6  | 1 | 9    | 1  | 19 3/4   | 17 1/2   | 19 23/32 | 17 15/32 | .158  | .179  | 200  | 1620 | 1820 | 89.01 |
| 7  | 2 | 8    | 2  | 19 17/32 | 17 11/16 | 19 15/32 | 17 5/8   | .320  | .350  | 400  | 1440 | 1840 | 78.26 |
| 8  | 3 | 7    | 3  | 19 17/32 | 17 11/16 | 19 15/32 | 17 5/8   | .320  | .350  | 600  | 1260 | 1860 | 67.74 |
| 9  | 4 | 6    | 4  | 19 17/32 | 17 11/16 | 19 7/16  | 17 5/8   | .480  | .350  | 800  | 1080 | 1880 | 57.45 |
| 10 | 5 | 5    | 5  | 19 17/32 | 17 11/16 | 19 7/16  | 17 19/32 | .480  | .530  | 1000 | 900  | 1900 | 47.37 |
| 11 | 6 | 4**  | 6  | 19 17/32 | 17 11/16 | 19 13/32 | 17 19/32 | .640  | .530  | 1200 | 720  | 1920 | 37.45 |
| 12 | 7 | 3**  | 7  | 19 17/32 | 17 11/16 | 19 13/32 | 17 9/16  | .640  | .710  | 1400 | 540  | 1940 | 27.82 |
| 13 | 8 | 2**  | 8  | 19 17/32 | 17 11/16 | 19 3/8   | 17 17/32 | .800  | .890  | 1600 | 360  | 1960 | 18.34 |
| 14 | 0 | 0**  | 16 | 17 1/16  | 16 1/32  | 16 7/8   | 15 13/16 | 1.102 | 1.367 | 1600 | —    | 1600 | 00.00 |

*= inches
**= comparative
$^1$= pounds

EXAMPLE 15

The process of Example 1 was again followed through Step E, i.e. production of a copy master and use of this copy master to produce a decorative laminate. The laminate size was 4 × 10 ft. and the core build-up was 1 lamination of Clupak on each side of 9 laminations of No. 7D asbestos, i.e. as in 6 of Table 3. The copy master was used 100 times to produce 100 decorative laminates. At intervals during the pressings, the master was measured in both the length and width directions for shrinkage. The results are set forth in Table 4, below.

TABLE 4

| No. of Pressings | Inches Lost-Length | Inches Lost-Width |
|---|---|---|
| 7   | 1/8   | 1/8   |
| 10  | 9/64  | 5/32  |
| 24  | 3/16  | 15/64 |
| 30  | 13/64 | 1/4   |
| 38  | 7/32  | 17/64 |
| 50  | 15/64 | 19/64 |
| 64  | 1/4   | 5/16  |
| 100 | 9/32  | 11/32 |

As is readily apparent, after 100 pressings, the copy master still retains sufficient size so as to enable its use in the manufacture of additional laminates. The width rate of the shrinkage appears to be the controlling factor in this regard. Based on the minimum size allowable in the pressing of 4 foot wide laminates, the projected lifetime of the exemplified copy master is about 300 pressings, clearly a remarkable result when it is considered that each design master and each reproduction master could also be used for that number of pressings in the manufacture of additional masters.

EXAMPLE 16

The procedure of Example 1, Steps A and B, was again followed except that the core constituted six sheets of asbestos paper prepared of No. 3 size fibers and 4 sheets of Clupak telegraphing preventative on

EXAMPLE 18

Replacement of the asbestos paper sheets of Example 1 with 6 asbestos sheets produced from No. 6 fibers and weighing 10 lbs./100 ft.$^2$ produced a design master, a reproduction master and a copy master equivalent to those discussed therein. The decorative laminates produced had the textured design clearly set out on their surfaces.

EXAMPLE 19

The asbestos paper sheets of Example 1 were replaced by 5 sheets of asbestos paper produced from No. 5 fibers and weighing 16 lbs./100 ft.$^2$ and 1 extra sheet of Clupak was added to each side thereof. When the masters were produced according to Steps B–D and used to fabricate decorative laminates, 53 pressings were conducted with a loss in size of only 1/16 inch in both width and length.

EXAMPLES 20–22

Replacement of the Clupak telegraphing preventative layers of Examples 1, 16 and 18 with (20) regular Kraft paper, (21) alpha-cellulose paper and (22) an opaque overlay paper resulted in excellent laminates with substantially no apparent asbestos fiber telegraphing.

We claim:
1. A heat and pressure consolidated, durable, heat-stable, embossed design master for use in producing embossed laminates consisting essentially of at least about 45%, by weight, on a resin-free basis, of at least five thermoset resin impregnated asbestos paper sheets of which at least about 85%, by weight, is bound asbestos fibers of No. 3 to No. 7 size, and, on at least one major surface thereof, not more than about 55%, by weight, on a resin-free basis, of at least one sheet of thermoset resin impregnated cellulosic extensible kraft paper which acts as a telegraphing preventative, the master being embossed on said sheeted major surface, said sheeted major surface forming an exterior surface of said master adapted to contact the surface of a laminate during the formation thereof to impart an embossment thereto.

2. A master according to claim 1 wherein both major surfaces of said consolidated asbestos sheets have at least one sheet of a thermosetting resin impregnated cellulosic extensible kraft paper thereon.

3. A master according to claim 2 wherein both said sheeted major surfaces are embossed.

4. A master according to claim 1 wherein said kraft paper has a bonded metallic layer thereon.

5. A process for producing a heat and pressure consolidated, durable, heat-stable, embossed design master for use in producing embossed laminates which comprises
   A. releasably impressing a sculptured design plate under heat and pressure into the kraft paper sheeted surface of an assemblage of at least about 45%, by weight, on a resin-free basis, of at least five thermosetting resin impregnated asbestos paper sheets of which at least about 85%, by weight, is bound asbestos fibers of No. 3 to No. 7 size, and not more than about 55%, by weight, on a resin-free basis, of at least one sheet of thermosetting resin impregnated cellulosic extensible kraft paper which acts as a telegraphing preventative to form an embossment on said sheeted surface of said master and recovering the resultant embossed master.

6. A process according to claim 5 including
   B. releasably impressing said embossed design master under heat and pressure into the kraft paper sheeted surface of a second assemblage identical to (A) to produce a reproduction master, and
   C. releasably impressing said reproduction master under heat and pressure into the kraft paper sheeted surface of a third assemblage identical to (A) to produce a copy master and recovering the resultant embossed copy master.

7. A process according to claim 5 wherein said assemblage comprises extensible kraft paper on both major surfaces of said assemblage of asbestos sheets.

8. A process according to claim 7 wherein both major surfaces of said assemblage of asbestos sheets are impressed.

9. A process according to claim 5 wherein a metal foil is bonded atop said extensible kraft paper sheet.

10. A process for producing a heat and pressure consolidated, embossed, decorative laminate which comprises
   A. releasably impressing a sculptured design plate under heat and pressure into the kraft paper sheeted surface of an assemblage of at least about 45%, by weight, on a resin-free basis, of at least five thermosetting resin impregnated asbestos paper sheets of which at least about 85%, by weight, is bound asbestos fibers of No. 3 to No. 7 size, and not more than about 55%, by weight, on a resin-free basis of at least one sheet of thermosetting resin impregnated cellulosic extensible kraft paper which acts as a telegraphing preventative to form an embossment on said sheeted surface of said master,
   B. releasably impressing said master under heat and pressure into the kraft paper sheeted surface of a second assemblage identical to (A) to produce a reproduction master,
   C. releasably impressing said reproduction master under heat and pressure into the kraft paper sheeted surface of a third assemblage identical to (A) to produce a copy master and
   D. releasably impressing said copy master under heat and pressure into a superimposed assemblage of thermosetting resin impregnated kraft sheets, a thermosetting resin impregnated decorative sheet and a thermosetting resin impregnated overlay sheet and recovering the resultant embossed decorative laminate.

* * * * *